Feb. 2, 1937.                H. A. CURTIS                2,069,226
              MAKING PHOSPHATE FERTILIZER AND NITRIC ACID
                          Filed June 6, 1935
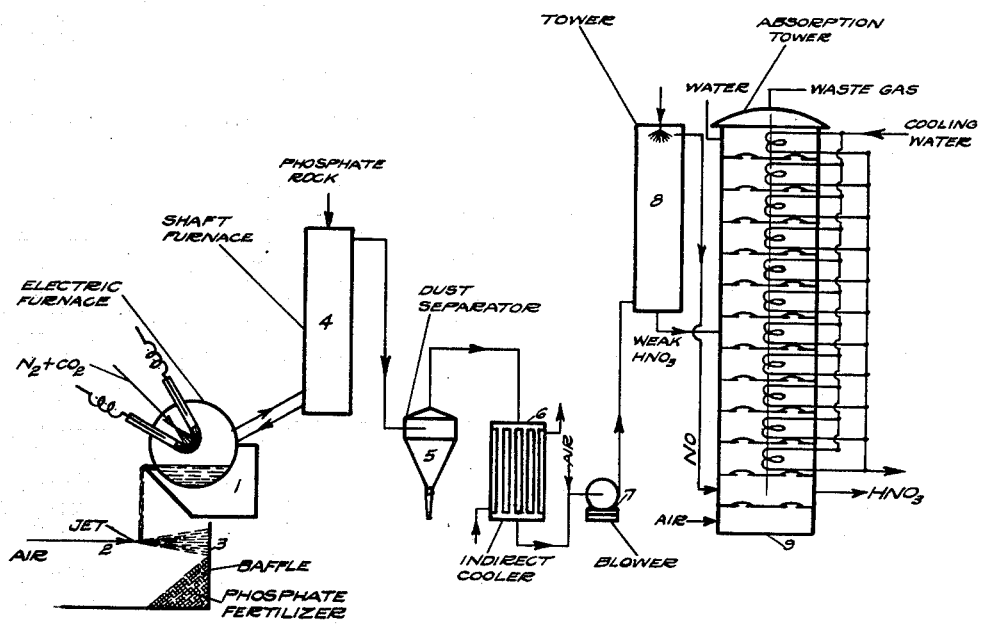
HARRY A. CURTIS
INVENTOR
BY *Arthur L. Davis*
ATTORNEY

UNITED STATES PATENT OFFICE 2,069,226

MAKING PHOSPHATE FERTILIZER AND NITRIC ACID

Harry A. Curtis, Knoxville, Tenn., assignor to Tennessee Valley Authority, Wilson Dam, Ala., a corporation Application June 6, 1935, Serial No. 25,281

3 Claims. (Cl. 71—44)

(Granted under the act of March 3, 1883, as amended April 30, 1928; 370 O. G. 757)

This application is made under the act of April 30, 1928, and the invention herein described, if patented, may be manufactured and used by or for the Government for governmental purposes without the payment to me of any royalty thereon.

This invention relates to the production of intermediate and finished fertilizer materials, particularly the production of phosphate fertilizer and fixed nitrogen.

One of the objects of this invention is to utilize the gaseous mixture of nitrogen and carbon dioxide obtained during the production of phosphorus or phosphoric acid by means of the blast furnace or electric furnace method. Another object of this invention is to obtain a higher percentage of fixed nitrogen from the gas which has been passed through an electric arc, than is otherwise available when air is passed through the arc. Still another object of this invention is to utilize the heat produced by the electric arc in the process of nitrogen fixation to produce a phosphate fertilizer. Other objects of this invention include the combined production of a phosphate fertilizer and intermediate materials which may be used in fertilizer manufacture.

In my co-pending application, Ser. No. 25,091, filed June 5, 1935, for Producing phosphorus and phosphate fertilizer, I have described and claimed a process which produces a gaseous mixture comprising essentially nitrogen and carbon dioxide. In this process substantially all of the phosphorus present in the phosphorus reduction furnace gases has been removed and recovered but it has been found difficult to remove all traces of phosphorus compounds from any gas which has at one time contained elemental phosphorus.

I have found that the gaseous mixture resulting from the combustion of phosphorus reduction furnace gases, containing substantially a mixture of nitrogen and carbon dioxide with a trace of phosphorus compounds, obtained either by the separation of a very substantial proportion of the phosphorus from the gaseous mixture and subsequent burning, or by burning the reduction furnace gas with subsequent hydration of the phosphorus pentoxide and separation of the phosphoric acid produced, may be utilized as a raw material in the fixation of nitrogen by the arc process to obtain a higher nitric oxide content, particularly when the gaseous mixture from the arc is cooled by passing in contact with phosphate rock, which is fed into the zone of influence of the arc in order that it may be fused and subsequently atomized to render it available for plant food. The nitric oxide in the cooled gaseous mixture is oxidized to nitrogen peroxide and separated as nitric acid, an essential intermediate fertilizer material.

The accompanying drawing, which forms a part of this specification, is a diagrammatic, vertical, sectional view of one form of apparatus for the embodiment of my invention. A mixture of nitrogen and carbon dioxide, obtained from the combustion of phosphorus reduction furnace gases, is passed through the flaming arc of the electric furnace 1, to form a gaseous mixture which contains nitric oxide, and phosphate rock is fused by heat from the arc. The fused phosphate rock is atomized by a blast from the jet 2, the atomized particles cooled in a gaseous atmosphere and collected against the baffle 3. The gaseous mixture from the arc is passed countercurrently in contact with the phosphate rock, fed to the electric furnace 1, in the shaft furnace 4 and a substantial proportion of the dust particles carried from this shaft furnace are separated in the dust separator 5. The gaseous mixture is then cooled by the indirect cooler 6. This mixture, together with air, passes into the intake of the blower 7, which discharges the mixture into the tower 8, where the preliminary oxidation of the nitric oxide takes place and the nitrogen peroxide formed absorbed in water to produce dilute nitric acid. The gaseous mixture, still containing some of the nitric oxide, passes from the tower 8, together with additional air, into the bottom of the absorption tower 9, where the nitric oxide reacts with oxygen to form nitrogen peroxide, and the nitrogen peroxide reacts with water to form nitric acid. The dilute nitric acid from the bottom of the tower 8, is passed into a mid-section of the absorption tower 9, to serve as an absorbent in the latter, and to supply the water required for the reaction to form nitric acid. Cooling water is circulated in closed coils in the various sections which make up the absorption tower 9, to remove the heat produced in the respective reactions which take place within that tower. The waste gases are vented from the top of the absorption tower 9, and the strong nitric acid is withdrawn from a section near the bottom of the tower.

This invention affords a process for the utilization of otherwise valueless by-products obtained in producing phosphorus, phosphoric acid and phosphate fertilizer, which is particularly advantageous by virtue of the fact that the equilibrium proportions of nitric oxide in a mixture of nitrogen and carbon dioxide are substantially higher than those for a mixture of nitrogen and oxygen in the proportions in which they exist in air for a corresponding temperature. For example, where the equilibrium percentage of nitric oxide in air at the temperatures of 2000° C. and 2500° C. is 1.0% and 2.5%, respectively, the percentage of nitric oxide in a mixture of equal molecular proportions of nitrogen and carbon dioxide at the same temperatures is 2.5% and 7.5%, respectively. It is also particularly advantageous to cool rapidly the gaseous mixture of nitrogen and carbon dioxide in which the highest proportion of nitric oxide has been formed by contact with the cold phosphate rock, in order that the highest possible concentration of nitric oxide may result.

It is evident that there are numerous factors which will influence conditions for the most satisfactory operation of my process, the actual limits of which cannot be established except by detailed study of each set of raw materials and intermediate and finished products involved. The gaseous mixture of nitrogen and carbon dioxide may be derived from any source so long as the gaseous mixture contains a substantial proportion of these two gases. However, it is preferred to use the mixture of nitrogen and carbon dioxide produced from the combustion of phosphorus reduction furnace gases prepared in the manner previously described. The hot gases after passage through the electric arc may contact the phosphate rock in any suitable manner so long as rapid cooling of the gases is effected. The partially heated phosphate rock passes into the zone of influence of electric arc but not in contact with electrodes, so that the heat produced by the arc may be utilized for the fusion of the rock with its subsequent dispersion and rapid cooling to form phosphatic fertilizer of high availability. The gaseous mixture which has been partially cooled by contact with the phosphate rock is preferably passed through a dust separator to remove suspended particles of the rock carried by the mixture and subsequently cooled in one or a plurality of indirect coolers to lower the temperature of the gases sufficiently for subsequent steps in the process. The cooled gaseous mixture is then passed through a plurality of towers or one or more combination towers in which the nitric oxide is oxidized to nitrogen peroxide and the nitrogen peroxide is reacted with water to form nitric acid and nitric oxide which is further combined in the manner which has just been described. The fixed nitrogen produced by the process may be separated either as nitric oxide, nitrogen peroxide, nitric acid or combined with bases to produce nitrites or nitrates.

It will be seen, therefore, that this invention actually may be carried out with the modification of certain details without departing from its spirit or scope.

I claim:
1. Process of making phosphate fertilizer and nitric acid from phosphate rock and a mixture of nitrogen, carbon dioxide and phosphorus pentoxide obtained from the combustion of phosphorus reduction furnace gases from which a substantial portion of the phosphorus has been removed, which comprises passing the mixture of nitrogen, carbon dioxide and phosphorus pentoxide through an electric arc to form nitric oxide; fusing the phosphate rock by heat from the electric arc; quenching the fused phosphate rock to make the phosphate available as plant food; partially cooling the hot gaseous mixture leaving the zone of the electric arc by countercurrent contact of the gaseous mixture with the phosphate rock before fusion; further cooling the gaseous mixture after contact with the phosphate rock; oxidizing the nitric oxide, contained in the cooled gaseous mixture, to nitrogen peroxide; and absorbing the nitrogen peroxide in water to form nitric acid.

2. Process of making phosphate fertilizer and nitric acid from phosphate rock and a mixture of nitrogen, carbon dioxide and phosphorus pentoxide obtained from the combustion of phosphorus reduction furnace gases from which a substantial portion of the phosphorus has been removed, which comprises passing the mixture of nitrogen and carbon dioxide and phosphorus pentoxide through an electric arc to form nitric oxide; fusing the phosphate rock by heat from the electric arc; quenching the fused phosphate rock to make the phosphate available as plant food; partially cooling the hot gaseous mixture leaving the zone of the electric arc by countercurrent contact of the gaseous mixture with the phosphate rock before fusion; and removing the nitric oxide from the cooled gaseous mixture as nitric acid.

3. Process of making phosphate fertilizer and fixed nitrogen from phosphate rock and a mixture of nitrogen, carbon dioxide and phosphorus pentoxide, which comprises passing the mixture of nitrogen, carbon dioxide and phosphorus pentoxide through an electric arc to form nitric oxide; fusing the phosphate rock by heat from the electric arc; partially cooling the hot gaseous mixture leaving the zone of the electric arc by countercurrent contact of the gaseous mixture with the phosphate rock before fusion; and removing the nitric oxide from the cooled gaseous mixture.

HARRY A. CURTIS.